Dec. 24, 1968  L. R. M. BATHELLIER  3,418,096
OPERATIONAL SAFETY MOLD CAM BYPASS
Filed Sept. 15, 1964  2 Sheets-Sheet 1
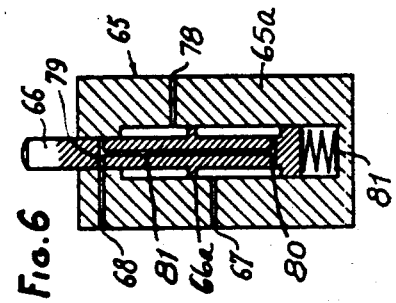
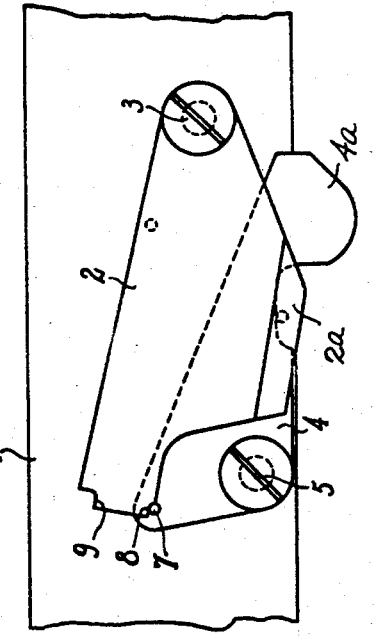
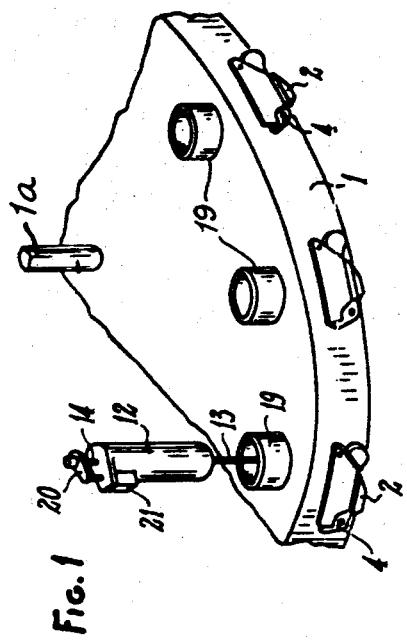
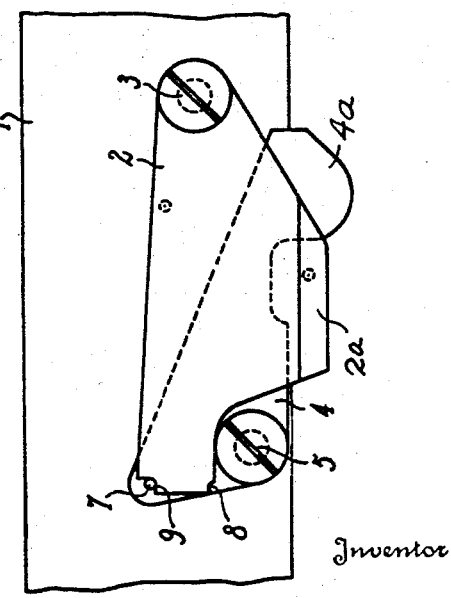
Inventor
L.R.M. BATHELLIER
By
Bauer and Seymour Attorneys Dec. 24, 1968  L. R. M. BATHELLIER  3,418,096
OPERATIONAL SAFETY MOLD CAM BYPASS
Filed Sept. 15, 1964  2 Sheets-Sheet 2
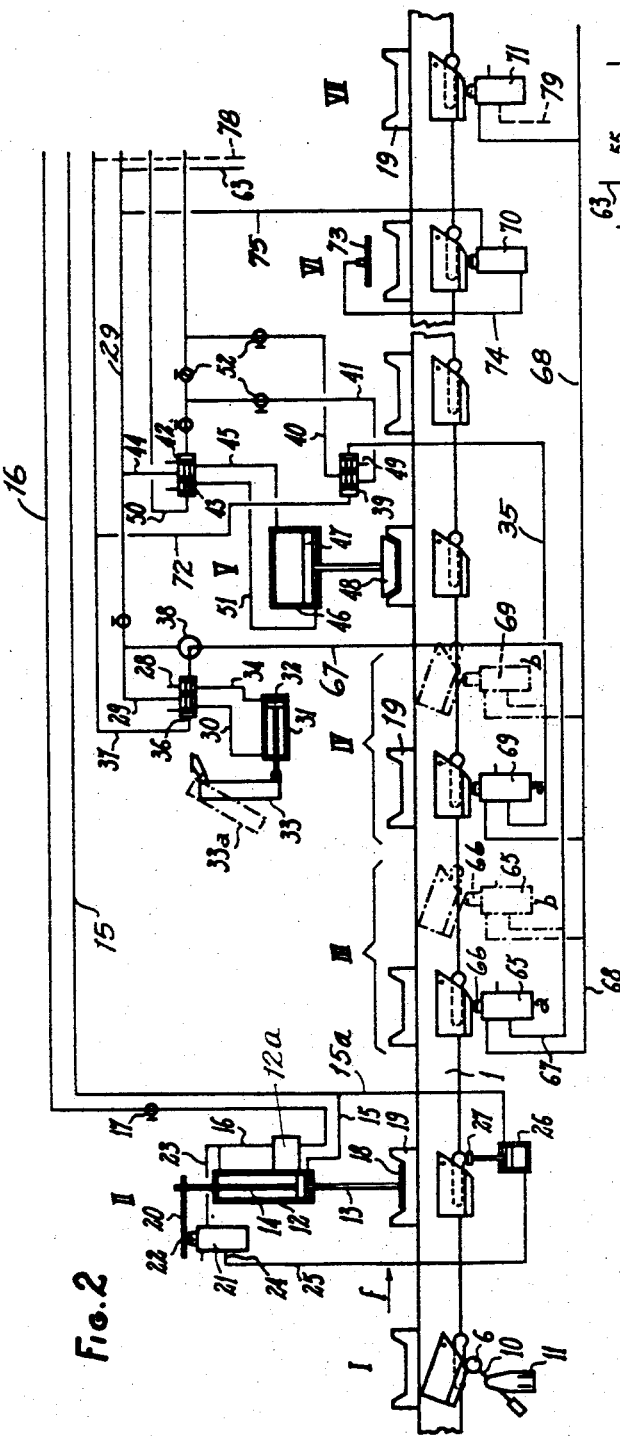
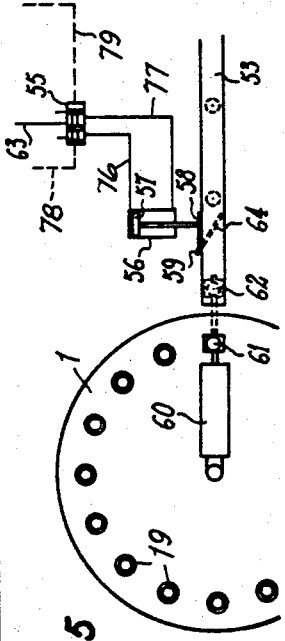
Inventor
L.R.M. Bathellier
By
Bauer and Seymour Attorneys United States Patent Office 3,418,096
Patented Dec. 24, 1968

3,418,096
OPERATIONAL SAFETY MOLD CAM BYPASS
Louis Robert Marie Bathellier, La Chapelle-Saint-Mesmin, France, assignor to Compagnie de Saint-Gobain, Neuilly-sur-Seine, France
Filed Sept. 15, 1964, Ser. No. 396,600
Claims priority, application France, Sept. 20, 1963, 948,173
20 Claims. (Cl. 65—29)

ABSTRACT OF THE DISCLOSURE

Apparatus for the fabrication of objects molded from plastic material such as hot glass. A turret rotatable about a central axis, carries a plurality of molds uniformly spaced about and adjacent its periphery, and is automatically stepped around, with dwell between each step, to bring each mold into registration with a number of successive work stations. The turret carries at its periphery a number of safety cam devices, one adjacent each respective mold. Each cam device is pivotable between active and inactive position and is releasably latchable in each position. At a selected station means operates to eject a finished article from each mold, in succession. On the next step an abutment fixed adjacent the turret engages and successively operates each cam device to inactive position. On the second or succeeding step a plunger descends into the mold thereat. If the mold at that station is empty, the plunger descends for a full stroke into it and thus operates a valve effecting return of the corresponding cam device to active position. However, if an object has been left in the mold through failure to eject, the plunger is stopped short of a full stroke, fails to operate the valve and leaves the corresponding cam device inactive. When an empty mold is detected, the cam for that mold, being active, operates at subsequent and sequential stations to deposit a gob of plastic material into that mold, to press the material to shape in the mold, to cool the shaped article, and to eject it from its mold. However, if an object is detected in any given mold after passing the ejection station, the corresponding cam device remains inactive and in failing to operate subsequent valves, prevents deposit of material into that mold, renders the press inactive, etc. Thus, while the failure to eject an article from any given mold, in effect withdraws that mold from production until the article is removed therefrom, it does not affect the functioning of the machine with respect to the remaining molds which have been properly vacated. The ejecting means passes the finished articles to a conveyor and means automatically operated by the machine pushes, for example, each tenth article, off the conveyor at an inspection station.

This invention relates to machines for producing hollow objects of glass or other moldable material. More particularly it relates to machines of the type wherein a platform or turret, on which are disposed a plurality of molds, rotates about an axis step by step to provide dwell periods wherein each mold is presented in succession to a series of fixed work stations. After a cycle involving operations thereon at each station, the article or workpiece is extracted or expelled from the machine and a cycle for the empty mold is restarted.

The molds upon the turret are so disposed that at each stoppage or dwell, each mold is presented to a work station where a definite operation is performed. Thus in the case of fabrication of glass objects, any given mold is first stopped at a station where a mass or globule of molten glass is deposited therein. At the next succeeding stations the glass is, for example, pressed, reheated, and the finished product extracted.

The extraction of the article or workpiece is effected by a push rod. The object is then grasped by a system of claws or fingers and transported by an arm to, and deposited upon a conveyor.

When, in prior art procedures, the completed article is not removed from its mold at the extraction station, it is necessary to manually stop the machine in order to prevent the deposit of another charge of glass or other material onto the article accidentally remaining in the mold, and a subsequent pressing operation which will damage the mold and press.

The present invention has for its chief object the provision of a machine which will avoid the necessity for manual intervention in a situation such as that discussed in the preceding paragraph, and which will automatically assure proper functioning at all times.

The operation of the machine forming the subject of the invention involves the automatic detection of an article accidentally left in a mold after the same has passed the station at which it should have been extracted or ejected and in response to such detection, to stop the operations at the various work positions. Expulsion of the object resting in the mold then enables resumption of operation of the machine.

The means by which the foregoing functions are effected comprises a cam or equivalent part associated with each mold upon the turret, and moved to one of two positions by the action of a feeler which enters each mold in succession just after that mold passes the extraction station. If the mold is empty the machine is permitted to continue normal operation. But if there is an object in the mold the machine is prevented from operating at the aforesaid work stations.

Other objects and advantages of the machine will become clear to those skilled in the art, after a study of the following detailed description of a machine embodying the invention and adapted for the manufacture of hollow objects, in conjunction with the drawings wherein:

FIGURE 1 is a schematic perspective view of a portion of the rotatable turret and showing several of the molds and the cam devices carried by the turret;

FIGURE 2 is a schematic layout showing a development of the circularly arranged molds and the corresponding stations at which each mold is stopped, together with the operating means at two stations, namely, charging the molds and pressing the material therein, together with safety controls for these two stations;

FIGURE 3 is an enlarged detail view of one of the cam devices in lowered or operating position;

FIGURE 4 shows the same cam device in raised or inactive position;

FIGURE 5 is a schematic view of the turret and controls at the ejection station of the turret, by which a finished article is pushed off a conveyor for inspection; and FIGURE 6 is an axial sectional view of one of the valves activated by the cam devices such as that shown upon FIGURES 3 and 4.

Referring in detail to the drawing, 1 identifies a circular horizontal turret, table or platform, rotatable about a vertical axis defined by shaft 1a, FIGURE 1. A plurality of molds 19 are fixed to the upper surface of the table adjacent the periphery thereof, and in equiangularly-spaced relation about the axis of rotation. The periphery of the turret has a plurality of cam devices fixed thereto. Each device is preferably but not necessarily located in a common radial plane with a respective one of the molds. These cam devices are all alike and one of them is shown to an enlarged scale upon FIGURES 3 and 4, where it is seen to consist principally of an irregularly-shaped vertically-disposed cam plate 2 pivoted at one end by machine screw 3 to the periphery of turret 1, for limited rotation about a normally horizontal axis, and a vertically-disposed latch plate 4 parallel with plate 2 and pivoted by screw 5 to the periphery of the turret.

When plates 2 and 4 are in the position shown upon FIGURE 3, a pin 7 on plate 4 engages in a notch 9 in one corner of plate 2 so that the latter is in effect, releasably locked in the position shown. Latch plate 4 has a nose 4a depending below the lower level of the turret; and when this nose, in rotation of the turret, is raised by engagement with an abutment 6, FIGURE 2, and pivotally mounted by arm 10 upon a fixed base 11, pin 7 is first cammed out of notch 9 and plate 2 is released for pivoting by the abutment, about its pivot screw 3, to the raised position of FIGURE 4 wherein pin 7 is in position to engage in a second notch 8 at the lower corner of plate 2 as the latter is released by the abutment. Plate 2 is thereby releasably held in its raised or inactive position shown upon FIGURE 4. The pivotal mounting of the abutment 6 is a safety measure to avoid injury in case someone's hand become accidentally or inadvertently interposed between abutment 6 and turret 1. Furthermore, as an added security feature the cam devices are preferably mounted within or behind a circular case, wall or skirt, not shown.

Abutment 6 and its mounting post 11 are positioned relatively to the platform so that the abutment will engage each cam assembly in succession as the latter, in rotation of the turret, leaves the extraction station. The direction of rotation is indicated by arrow f, FIGURE 2. Thus as each mold leaves the extraction station, in the manner shown at station I, FIGURE 2, abutment 6 first engages nose 4a to pivot plate 4 counterclockwise as viewed upon FIGURES 1, 2, 3 and 4, to thus move pin 7 out of notch 9 in plate 2. The plate is thus freed and as the turret continues rotation abutment 6 engages the lower edge 2a of plate 2 and pivots the plate clockwise from the position shown upon FIGURE 3, to that shown at FIGURE 4, where it is held in elevated or inactive position by engagement of pin 7 in notch 8.

Feeler or sensing means is shown at station II, FIGURE 2, located immediately following departure of any given mold from the ejection station. This sensing means comprises a fixed vertically-disposed cylinder 12 having therein a piston with rods 13 and 14 extending downwardly and upwardly through glands in the respective ends of the cylinder. Rod 13 has a sensing or feeler element 18 secured to its lower end and shaped and sized to enter the mold. Compressed air for operating the piston upwardly is introduced from a source, not shown, through conduit 15 to the base of the cylinder. Likewise, compressed air from the same source is introduced through conduit 16 into the top end of the cylinder to drive the piston therein downwardly. This conduit as shown, extends through a support 12a for the cylinder. Conduit 16 has a manually-actuated valve 17 therein.

When the mold at station II is empty or devoid of an article or workpiece, and air is introduced into the top of the cylinder, through pipe 16, the assembly of piston, rods, and feeler 18 is moved downwardly until feeler contacts at or near the base or bottom of the mold. An arm 20 is fixed to the top of rod 14 to extend radially therefrom. See FIGURES 1 and 2. A valve 21 of known construction has an actuable member 22 vertically slidable in its casing. A branch pipe 23 leads from pipe 16 to valve 21 and an outlet pipe 25 extends from the valve to a cylinder 26 fixed at station II a little below platform 1. Cylinder 26 has therein a piston with rod extending through a gland at the top end thereof. When the piston is elevated to the position shown, a head 27 fixed to the top end of the rod engages nose 4a of plate 4 and pivots the same counterclockwise so that cam plate 2 presently in the inactive position of FIGURE 4, is released by movement of pin 7 out of notch 8 and drops to the active position of FIGURE 3, where it is again releasably locked by re-entry of pin 7 into notch 9. Valve 21 is so constructed and arranged that when compressed air is introduced into conduit 16 to drive rods 13, 14 downwardly, and the mold at station II is empty, the resulting full descent of feeler 18 into the mold at this station causes arm 20 to engage valve member 22 and to open the valve to thereby connect pipes 23 and 25. The piston in cylinder 26 is thus elevated momentarily and, in the manner previously described, cam plate 2 is moved to the active or operating position of FIGURE 3.

The top end of cylinder 26 is connected with conduit 15 by way of a branch pipe 15a. This conduit under the circumstances described in the preceding paragraph, is not under pressure. But as the piston in cylinder 26 rises, air is forced into the base of cylinder 12 to raise the feeler clear of the mold.

When a completed object accidentally remains in mold 19 at station II, as by failure to eject the same due to malfunctioning of the ejection mechanism, its presence is automatically detected because feeler 18 cannot descend for a full stroke, as it can when no object is in the mold. In such a case, arm 20 does not descend a distance sufficient to engage valve member 22. The valve thus remains closed, no air under pressure is admitted to cylinder 26 and head 27 remains in its lowermost position wherein it is without effect upon cam plate 4. The plate thus remains in its inactive position shown upon FIGURE 4.

At position or station III, FIGURE 2, there are schematically indicated at a and b the two possible positions of the cam device 2, 4, etc. At this station the mechanism for subsequent operation upon the workpiece is made ready for the introduction of work material such as molten glass, into the mold. Position III(a) shows in full lines the position of the cam assembly wherein cam plate 2 has been moved by head 27 into its active position. Position III(b) shows in dotted lines the second or alternative position wherein, as depicted upon FIGURE 4, cam plate 2 remains in the inactive position to which it was moved by abutment 6 and which corresponds to the situation where an article has been accidentally left in the mold.

At station III there is located a valve 65, it being understood that the same valve is represented both by full and dot-dash lines. This valve may be a duplicate of item 21, previously described, the only difference being that the connections are such that the valve is normally open, and closed only by the aforesaid cam device when the latter is in its active or a position. Compressed air is supplied to valve 65 from a controller not shown, over a line 68 and discharged therefrom over a line 67 leading to charging mechanism for the mold, subsequently described.

The connections are such that when the cam device is in active position as shown at III(a) movable element 66 of the valve is pressed downwardly by the cam as the turret rotates so that the cam is over the valve. In such a case the valve is closed and no air passes from conduit 68 to conduit 67. As will be clear from the preceding description, such a situation corresponds to one wherein there is no finished object or workpiece accidentally or inadvertently left in the mold.

However, when such an object has been accidentally left in the mold after it passes the ejection station, cam 2 is in position III(b) and valve 65 remains open, so that pipes 67 and 68 remain in communication.

At 33 there is identified a nozzle or orifice for the discharge of a measured quantity of work material such as molten glass, into the mold. The nozzle is shown as mounted for pivotal movement about an axis normal to the plane of FIGURE 2. When in full line position the nozzle directs a measured charge of material into the mold. But when it is pivoted to the dotted line position 33a the charge is by-passed into a waste reservoir or sump.

A cylinder or servomotor 31 has therein a piston 32 with rod extending leftwardly as viewed upon FIGURE 2, into contact with nozzle 33. A pipe 30 connects a balanced piston valve 36 with the left end of cylinder 31. Likewise a pipe 34 connects valve 36 with the right end of the cylinder. Exhaust leads from valve 36 are indicated at 28. Conduit 67 leading from valve 65 connects with and supplies operating pressure fluid to the right end of valve 36, through a three-way valve 38 which is normally adjusted to connect conduit 67 with valve 36. A second conduit 37 leads to the other or left end of the valve 36. Air under pressure is conducted over pipe 29 to the center of valve 36.

The connections are such that when cam 2 is in position III(a) of FIGURE 2, that is, a position corresponding to that wherein no article has been accidentally left in the mold, the plunger of valve 65 is engaged and depressed by the cam and is moved to close this valve. Under this situation, pressure to the right end of valve 36 is cut off and pipe 67 is vented to atmosphere by this valve. The piston of valve 36 is thus moved to its righthand position by pressure coming over line 37 wherein, as shown upon the figure, pipes 29 and 30 are connected and the piston in cylinder 31 is positively moved and held in the position shown wherein nozzle 33 is effective to charge the mold.

On the other hand, when an article has been left in the mold after the latter leaves the ejection station, cam 2 is in the raised position of III(b) and FIGURE 4. In such case the cam does not depress the plunger of valve 65 as it passes thereover in rotation of platform or turret 1. Conduits 67 and 68 remain connected and as the controller applies a pulse of pressure to conduit 68 the piston in valve 36 is forced to its left hand position wherein pressure supplied over pipe 29 is connected to pipe 34 so that piston 32 is forced to the left and nozzle 33 is pivoted to the dot-dash position 33a wherein it is ineffective to deposit a charge into the mold.

At station IV, FIGURE 2, further preparation is carried out for a pressing operation which takes place at station V. At station IV there is represented, as at station III, a valve 69 which may be a duplicate of valve 65. As previously, IV(a) shows in solid lines a condition where no article has been left in the mold, so that cam plate 2 remains in its lower or active position and thus engages and depresses the plunger of valve 69 to effect closure thereof. It will be noted that valve 69 is connected over 68 with the same controller as valve 65. A pipe 35 leads from valve 69 to one end of the cylinder of a balanced three-way piston valve 39. The other end of the valve is connected by a branch pipe 72 from pressure pipe 37 previously described. Thus when cam 2 is in its lowered or active position corresponding to the situation where no article is in the mold, position IV(a), valve 69 is closed and cuts off pressure otherwise supplied to valve 39 over pipe 35. Thus pressure coming in over pipe 72 is unbalanced and the piston of valve 39 is forced to its limiting position to the right. In this right hand position the valve connects a pipe 40 from the source of pressure, with outlet pipe 41 leading to the right end of the cylinder of a four-way balanced piston valve 42. The upper one of the three valves 52 is closed. Piston 43 is thereby forced to its left position as shown, wherein it connects pressure supply pipe 29, over branch 44, with pipe 45 leading to the top of press cylinder 46. The piston of the press is thus forced downwardly to move its plunger 48 into the mold thereby shaping the plastic material previously deposited therein at station IV.

On the other hand, when cam 2 is in the position IV(b), it passes valve 69 without effect thereof, thus leaving pipes 68 and 35 in communication. The resulting pulse of pressure from the controller acts upon the piston of valve 39 to connect pipe 40 to exhaust at 49. Since piston 43 in four-way valve 42 is normally urged to the right by pressure arriving over pipe 50, piston 43 is now driven to the right and connects pressure pipe 44 with a pipe 51 leading to the base of press cylinder 46, below piston 47 therein. Since the rightward position of piston 43 at this time connects press cylinder 46 above its piston 47 to exhaust, over line 45, the press is held with its piston elevated so that it cannot descend in a working stroke. The three valves, all identified by numeral 52 are merely to enable manual control and operation when desired or necessary.

At station VI there is located a blower 73 for directing a blast of cooling air onto an object presently at this station. This blower or nozzle is connected with outlet pipe 74 from a valve 70 supplied with pressure fluid over a pipe 75 forming a branch from conduit 29. The arrangement is such that when cam 2 is moved to this station and is in its down or effective position, is presses the plunger of valve 70 to open the same and thus to direct a blast of cooling air upon the previously pressed hot article in the mold at this station. When the cam is in the inactive position, valve 70 remains closed as the cam passes thereover without contact.

The completed article is expelled from its mold at the extraction station, by mechanism indicated schematically at 60, FIGURE 5, to consist of a fixed cylinder, that is, one which does not rotate with turret 1. The control mechanism, not shown, is so adjusted as to direct pressure fluid into this cylinder as each mold containing a finished article passes opposite. The piston rod of cylinder 60 is thus forced radially outwardly to expel the article from the mold and onto a conveyor 53. Other means are known or may be developed for the expulsion of each finished article from its mold as it passes the ejection station.

It is desirable to periodically push one of the completed articles from the conveyor 53 to deposit the same at an inspection station so that it may be inspected to determine if the machine is working properly and turning out articles to a predetermined standard of perfection. For this purpose there is shown upon FIGURE 5, a servo-cylinder 56 with piston 57 having a rod adapted to contact a push plate 58. The push plate is mounted at one side of conveyor 53, for pivoting about an axis 59, from the inactive position shown in solid lines, to the position at 64 shown in dotted lines wherein it engages and shoves an article off the conveyor so that it may be inspected.

As viewed upon FIGURE 5, the top and bottom of cylinder 56 are in communication with pipes 76 and 77, respectively, extending from a three-way piston valve 55. This valve is supplied with pressure fluid over a conduit 63 which also appears upon FIGURE 2. When a cam 2 is in effective or active position and passes over valve 71 it depresses the plunger thereof and cuts off flow of fluid from pipe 68 to pipe 79. Pressure applied over pipe 78 is then unbalanced in the valve and the piston thereof is forced to the right where it connects pipe 63 with pipe 76 to force piston 57 downwardly as viewed upon FIGURE 5, and to pivot pusher 58 to the dotted line position thus moving an article off conveyor 53 where it may be inspected. If the cam is in its inactive position it has no effect upon the plunger of valve 71 as it passes thereover. Pressure in pipe 79 then remains effective to balance that acting on the piston of the valve by way of pipe 78. The piston remains in the position shown and pressure from pipe 63 is effective over pipe 77 to maintain piston 57 in its upper ineffective position shown.

FIGURE 6 shows in axial section one of the valves such as 65, having a casing 65a with an inlet at 68 as described in connection with FIGURE 2, an outlet 67, and exhaust 78. Plunger 66 has two axially-spaced diametral bores 79, 80, interconnected by an axial bore 81. A spring 82 normally urges plunger 66 to its upper position shown where bore 79 is aligned with inlet 68. In this position a flange 66a on the plunger separates outlet 67 from exhaust 78 and the inlet and outlet are in communication through bore 81. When the plunger is depressed as one of the cams 2 passes over and into contact with it, the inlet at 68 is cut off and flange 66a passes below outlet 67 to place the outlet in communication with exhaust at 78. All valves 21, 65, 69, 70 and 71 are essentially alike. In the case of valve 21 however, the exhaust and outlet such as 78 and 67 of valve 65, are interchanged, thus the inlet of valve 21 is normally open to exhaust and is connected to outlet only in response to depression of its plunger 22.

It will be understood that air under pressure to pipes or conduits 15, 16, 29, etc. is supplied only periodically in timed relation with rotation of turret 1. This function is effected by a controller which is not shown since it forms no part of the present invention. Basically, this controller may be, for example, a device in the nature of a commutator or circuit closer connected with turret 1 for rotation in timed relation therewith. The arrangement may be such that when turret 1 is momentarily stopped for a dwell period with each mold at one of aforesaid stations, a circuit is closed by the circuit closer. This circuit may control the solenoid of an electromagnetic valve. Of course the control may be effected through a relay. This valve is of the normally balanced type and spring-urged to closed position. The valve is opened for a relatively short period of time and when so opened, connects a source of pressure with pipes 16, 29, 37, 50 and 68 to apply a pulse of pressure thereto. Contact closing timing means, likewise not shown, will be connected with turret 1 to rotate the same step by step and to accurately position each mold in sequence beneath the various parts operating on the material in the molds. Such timing means will cause a dwell at each rotational position of the turret sufficient for the required operations, then effect another step of rotation. Merely as one example, a ratchet and pawl device will be associated with shaft 1a. The pawl will be electromagnetically energized and de-energized by an electrically-driven circuit-closing timer. Means such as a multi-lobed cam will be connected with shaft 1a which, in cooperation with a spring-pressed follower, will assure stoppage of the turret in its several positions and with a high degree of accuracy.

Operation

The operation will be generally clear from the foregoing description. As the turret is rotated step-by-step, so that a given mold 19 is at the ejection station as in FIGURE 5, the ejector 60, 61 operates to expel the finished article from the mold and to deposit it upon the conveyor. If, for any reason such as faulty operation of the ejector, the article remains in the mold, it moves therewith past the ejection station and into position or station I, FIGURE 2, where cam device 2, 4 is engaged by abutment 6 and moved to the inactive or raised position of FIGURE 4. The mold with article therein is next stepped around and stopped at station II where the controller, not shown, applies pressure over pipe 16. Pressure over pipe 16 forces feeler 18 downwardly. At the same time, downward movement of the piston in cylinder 12 acts to compress air below it and to force the same through pipes 15, 15a into the top end of cylinder 26 to assure that piston 27 is in its lowermost or depressed position.

If no article is in the mold, feeler 18 moves down to a limiting position wherein arm 20 engages plunger 22 of valve 21 and opens this valve to connect pipes 16 and 25. The piston in cylinder 26 is thereby raised and head 27 engages cam 2 and pivots it to its active or second position. At the same time air in cylinder 26 above the piston therein, is forced back to the base of cylinder 12 where it again elevates feeler 18 clear of the mold. However, under the condition being described wherein an article has been accidentally left in the mold, feeler 18 engages it and is stopped short of a full downward stroke. Valve 21 remains closed and the cam presently over head 27 remains in first or inactive position wherein it does not engage the plungers of valves 65 and 69 as it passes over them.

As the turret is stepped around to position III(b), with cam 2 inactive, valve 65 remains open. The controller connects pipe 68 with the source of pressure, which is applied to the piston of valve 36 to move it to the left where it connects pressure from line 29 with line 34. Line 30 is connected to exhaust. Piston 32 of servomotor 31 is thereby forced to its limiting position to the left and nozzle 33 is pivoted to its dot-dash position where it is ineffective to deposit material into the mold.

When cam 2 is in position III(a), valve 65 is closed and the nozzle remains in effective position to deposit a charge of material into the mold, as previously described.

When the cam device is in position IV(b), valve 69 remains open so that pressure conveyed by pipe 35 to valve 39 drives the piston thereof to the left and cuts off communication between pipes 40 and 41, while venting pipe 35 to exhaust at 49. Piston 43 in valve 42 is now driven to the right to connect lines 44 and 51 and thus hold press piston 47 elevated. However, when cam 2 is in position IV(a), valve 69 is closed and a pressure pulse over line 72 forces the piston in valve 39 to the right, so that pipes 40 and 41 are connected and piston 43 of valve 42 is driven to the left to connect pressure in pipe 44 with pipe 45, as shown. The piston and plunger of the press are thus forced down to press and shape the material in the mold.

It is thus apparent that I have provided an apparatus fulfilling all of the objects and advantages stated. When the device functions properly in ejection of finished articles at the ejection station, operation continues unabated in the normal and intended manner. But when the apparatus, for any reason, permits a finished article to remain in its mold, past the ejection station, all subsequent functions with respect to that mold are suspended and prevented until the article is removed. Damage to the mold, press, and other parts of the machine is thereby obviated. Furthermore, pressure is instantaneously available at all stations so that in normal operation valves such as 65 and 69 are closed by the action of the cam device as it passes thereover; and malfunctioning is prevented by the simple act of leaving these valves unoperated. The action is thus rapid but positive so that for any particular installation maximum production per unit time is assured because the machine can be operated at the same or higher speed with the invention than it can without.

Of course, the apparatus is not limited to the particular use disclosed but is capable of a wide range of uses and modes of operations. Likewise, numerous changes, alterations, modifications and substitutions of equivalents will readily occur to those skilled in the art, after a study of the foregoing disclosure. Hence the disclosure should be taken in an illustrative rather than a limiting sense.

Having thus fully disclosed the invention, what I claim and desire to secure by Letters Patent is:

1. In a device of the type described, a rotatable turret adapted to support a workpiece in fixed position thereon for movement therewith in sequence into an ejection station, a make-ready station and a work station, a tool mounted at said work station for operation upon a workpiece when moved thereadjacent in rotation with said turret, a cam device carried by said turret and movable between a first inactive position and a second active position, means at said ejection station to engage and move said cam device to inactive position, detection means at said make-ready station to detect the presence or absence of a workpiece on said turret at said station, and operating to move said cam means to its said active position only when no workpiece is present, normally inactive means to operate said tool, and means activating said normally inactive means by and in response to operation by said cam device in its said active position only, to effect movement of said tool into operation upon said workpiece, as said workpiece is moved to said work station in rotation of said turret.

2. In a device of the type described, a rotatable turret, a mold mounted on said turret for movement therewith in sequence into an ejection station, a make-ready station, and a work station, a cam device carried by said turret and movable from a first inactive position to a second active position, detection means at said make-ready station to detect the presence or absence of an article in said mold, and to move said cam device to active position only in response to the absence of an article in said mold, deposit means at said deposit station and movable between a first position wherein material is deposited in said mold and a second position wherein said deposit means is ineffective to deposit material into said mold, first power means operable to move said deposit means into its said second position, a tool at said work station for movement to operate on material in said mold, power means operable to move said tool to operate on material in said mold, and means operated by said cam device when in active position only, to effect movement of said deposit means to its said first position and to activate said tool as said mold moves with said turret into said deposit station and said work station, in sequence.

3. The device of claim 2, a plurality of molds mounted on said turret in equiangularly-spaced positions about the rotational axis thereof, and a plurality of said cam devices each mounted on said turret adjacent a respective one of said molds, said means at said ejection station engaging and moving each said cam device to inactive position in sequence, in step by step rotation of said turret.

4. In an apparatus for the fabrication of workpieces of moldable material, a support movable in a fixed path past a plurality of fixed stations spaced along said path, and adapted to support a plurality of workpieces spaced therealong, a plurality of elements each fixed at a respective one of said stations for sequential operations upon workpieces mounted on said support, a plurality of cam means carried by said support in spaced relation therealong for movement as a unit therewith, each said cam means being adjustable between a first inactive position and a second active position, fixed abutment means engageable with each said cam means in succession at a first said station in movement of said support, detection means at a second said station and movable to a first position, said detection means being arrested short of said first position by engagement with a workpiece at said second station, means actuated only by movement of said detection means to its said first position, to move each said cam means to its said second position as it moves to said second station, and means activated by each said cam means when in its said second position only, to operate said elements as each workpiece passes sequentially into stations occupied thereby in movement of said support along its path.

5. In an apparatus for the fabrication of plastic and moldable articles, a turret movable step-by-step in a fixed path past and adjacent a plurality of fixed stations, a mold on said turret movable therewith in sequence to dwell at each said station, a cam device carried by said turret and movable from a first inactive position, to a second active position, abutment means fixed at a first of said stations to engage and positively move said cam device to inactive position by and in response to movement of said turret therepast, a feeler mounted at a second station subsequent to said first station and movable into engagement with said mold thereat, power means energizable to urge said feeler into engagement with said mold at said second station, and means responsive only to energization of said power means and resulting movement of said feeler into engagement with said mold, to engage and move said cam device to its said second active position.

6. The apparatus of claim 5, means mounted at a third station subsequent to said second station, for depositing material into said mold at said third station, and engaged and operated by said cam device only when said cam device is in its said second and active position, to render said depositing means effective.

7. The apparatus of claim 6, said depositing means comprising a nozzle pivotable between a first position directing material into said mold, and a second position directing material away from said mold, a pneumatic servo-motor connected with said nozzle to pivot the same, and a pressure fluid line to said servomotor, and including a valve having a movable element engaged by said cam device only when the latter is in its said second operating position.

8. The apparatus of claim 7, said valve being normally open, passage of said cam device over and into contact with the movable element of said valve, moving the same to vent said pressure fluid line to exhaust.

9. In a machine for the automatic fabrication of objects, a support mounted for guided movement in a fixed path, a plurality of molds carried by said support in spaced relation along said path, a plurality of elements for operation on material in said molds each mounted at a respective one of a plurality of work stations over said support and in spaced parallel relation along said path, a plurality of cam means each mounted on said support in spaced relation along said path, each said cam means being movable from a first inactive position to a second active position, means fixed at a selected first station for moving each said cam means to first and inactive position, feeler means at a second station subsequent to said first station for movement into a first position contacting an object in the mold thereat, first means at said second station operable to move said cam means to its said second and active position, and second means responsive only to full movement of said feeler means to its said first position, to render said first means effective.

10. The apparatus of claim 9, normally ineffective deposit means at a third station subsequent to said second station, said deposit means being movable to a position effective to deposit material into the mold at said third station, and means responsive to each said cam means in second and active position only, as the same moves to said third station in movement of said support, to move said deposit means to its effective position.

11. The apparatus of claim 9, said cam means comprising a cam plate and a latch plate each individually pivoted to said support in overlapping relation, on a respective one of first and second axes spaced along said path, said latch plate having a nose engageable by said abutment means at said first station, to be pivoted thereby, interengaging means between said plates and operable when said latch plate is moved by said abutment means to sequentially release said cam plate, pivot said cam plate to inactive position, and releasably engage and hold said cam plate in inactive position after said latch plate is free of said abutment means.

12. An apparatus for the automatic fabrication of moldable material, comprising, a turret rotatable on a fixed axis, a mold mounted on the periphery of said turret and rotatable therewith into sequential positions each adjacent a respective one of a plurality of work stations, a cam carried by said turret adjacent said mold and movable between a first inactive position and a second active position, means at a first station engaging and moving said cam to first position, feeler means at a second station subsequent to said first station, and effective to move said cam into second position only by and in response to movement of said feeler means into contact with the mold at said second station, and to leave said cam in first position when said feeler means contacts an article in said mold, nozzle means mounted at a third station in position normally ineffective to discharge material into a mold at said third station, and means actuated by said cam in its said second position only as it moves into said third station, to render said nozzle means effective to discharge moldable material into said mold.

13. The apparatus of claim 12, a press mounted at a fourth station and including a plunger movable from a first retracted position to a second position operating upon material in said mold at said fourth station, and means at said fourth station and rendered effective only by contact with said cam when in its said second position, to actuate the plunger of said press to its said second position.

14. In an apparatus for the fabrication of moldable plastic articles, a rotatable turret, a mold on said turret, a tool carried by said turret and movable to operate upon material in said mold when said turret is in a predetermined position of rotation, fluid pressure operated means connected with said tool to so move the same, and a control for said fluid pressure operated means, said control comprising, a normally-balanced first valve, fluid pressure connections between said balanced valve and said fluid pressure operated means, to control operation of the latter, a first pipe connecting said balanced valve with a source of pressure fluid, a second pipe connecting said balanced valve with a source of pressure fluid to normally balance the pressure applied over said first pipe, a second valve in said second pipe and normally spring-urged to open position, a cam carried by said turret and movable between a first inactive position and a second active position, said cam when in active position only, engaging and closing said second valve to thereby unbalance said first valve and adjust the same to convey pressure fluid to said fluid pressure operated means, to energize the same and move said tool to operate upon material in said mold.

15. The apparatus of claim 14, stationary abutment means in advance of said tool and engaging and moving said cam to inactive position in response to rotation of said turret, means operable to sense material in said mold subsequent to said fixed abutment means and in advance of said second valve, in the direction of rotation of said turret, and means responsive only to the sensing by said sensing means, of an empty mold, to move said cam to active position.

16. In a machine for the fabrication of articles of moldable material, a horizontal turret rotatable about a central vertical axis, step-by-step past a plurality of stations, a plurality of molds carried by said turret in sequentially- and equiangularly-spaced relation about the periphery thereof, a plurality of cams carried by said turret, each adjacent a respective one of said molds, each said cam being adjustable between an active and an inactive position, means at a first station to engage and adjust each said cam, in succession, to inactive position, sensing means at a second station to detect the presence or absence of material in the mold at said second station, and to effect adjustment of said cam thereat, to active position only in response to detection of an empty mold, material discharge means at a third station and movable between first and second positions, ineffective and effective respectively, to discharge material into a mold at said third station, a press at a fourth station and operable to press material in a mold at said fourth station, a plurality of valves each at a respective one of said third and fourth stations and each normally spring-pressed to open position, first and second power means connected with said material discharge means and said press, respectively, to operate the same, and first and second pneumatic control means for said material discharge means and said press, and each including a respective one of said valves, each said pneumatic control means being rendered effective to activate said power means to deposit material into a mold at said third station and to press material in a mold at said fourth station, by and in response to closure of each said valve by cams at the respective stations thereof, when said cams are in active position only.

17. The machine of claim 16, air blast means at a fifth station and effective to direct a blast of cooling air onto a mold at said fifth station, a valve at said fifth station and spring-urged to closed position, conduit means including said last-named valve and connected with said air blast means to supply air under pressure thereto, each said cam in active position only at said fifth station, engaging said last-named valve to open the same.

18. The machine of claim 17, a conveyor adjacent said turret at a sixth dwell station thereof, ejection means at said sixth station and effective to expel an article from a mold thereat and to deposit the same on said conveyor, selectively operable means contiguous to said conveyor to unload an article therefrom, pressure connections to said expelling means and said ejection means, and including a control valve at said sixth station and a normally-balanced power valve, each said cam in active position only at said sixth station engaging and closing said control valve to unbalance said power valve and thereby energize said ejection means and, selectively, said unloading means.

19. The method of controlling actuation of an apparatus operable to effect sequential operations upon a workpiece, comprising, mounting a mold on a turret for step-by-step rotation therewith sequentially into a plurality of dwell stations to be operated upon by a plurality of devices, one at each said station, respectively, initially moving a cam rotatable with said turret into an inactive position, subsequently detecting the presence or absence of material in the mold and thereby moving the cam to active position only in response to detection of an empty mold, fixedly mounting a plurality of normally-open valves in the path of the cam, one at each of said stations, rotating the turret step-by-step to sequentially pass the cam contiguous to each valve to close the same when the cam is in active position only, and sequentially actuating each device to act upon a workpiece in the mold, only by and in response to closure of each respective valve by the cam.

20. In a machine for shaping plastic articles by pressure, a turret movable in and along a fixed path, in a predetermined direction, a mold carried by said turret to receive plastic material to be shaped, a cam device carried by said turret for movement therewith, and movable between a first inactive position and a second active position, abutment means fixed at a first station in and along said path, to engage and move said cam device to inactive position in movement past said first station, feeler means fixed at a second station in said path, subsequent to said first station, and mounted for movement into the mold at said second station, safety means at said second station, energizable to engage and move said cam device to second and active position, means operable to urge said feeler means into said mold when said mold is at said second station, and means operated only by a full stroke of said feeler means into said mold at said second station, to energize said safety means and thereby move said cam device to second and active position.

References Cited

UNITED STATES PATENTS

| 1,594,531 | 8/1926  | Kucera      | 65—159 |
| 1,603,979 | 10/1926 | Peiler      | 65—159 |
| 2,876,589 | 3/1959  | Hasell et al. | 65—160 |
| 2,958,159 | 11/1960 | Denman      | 65—159 |

DONALL H. SYLVESTER, *Primary Examiner.*

F. W. MIGA, *Assistant Examiner.*

U.S. Cl. X.R.

65—159, 158, 160